UNITED STATES PATENT OFFICE.

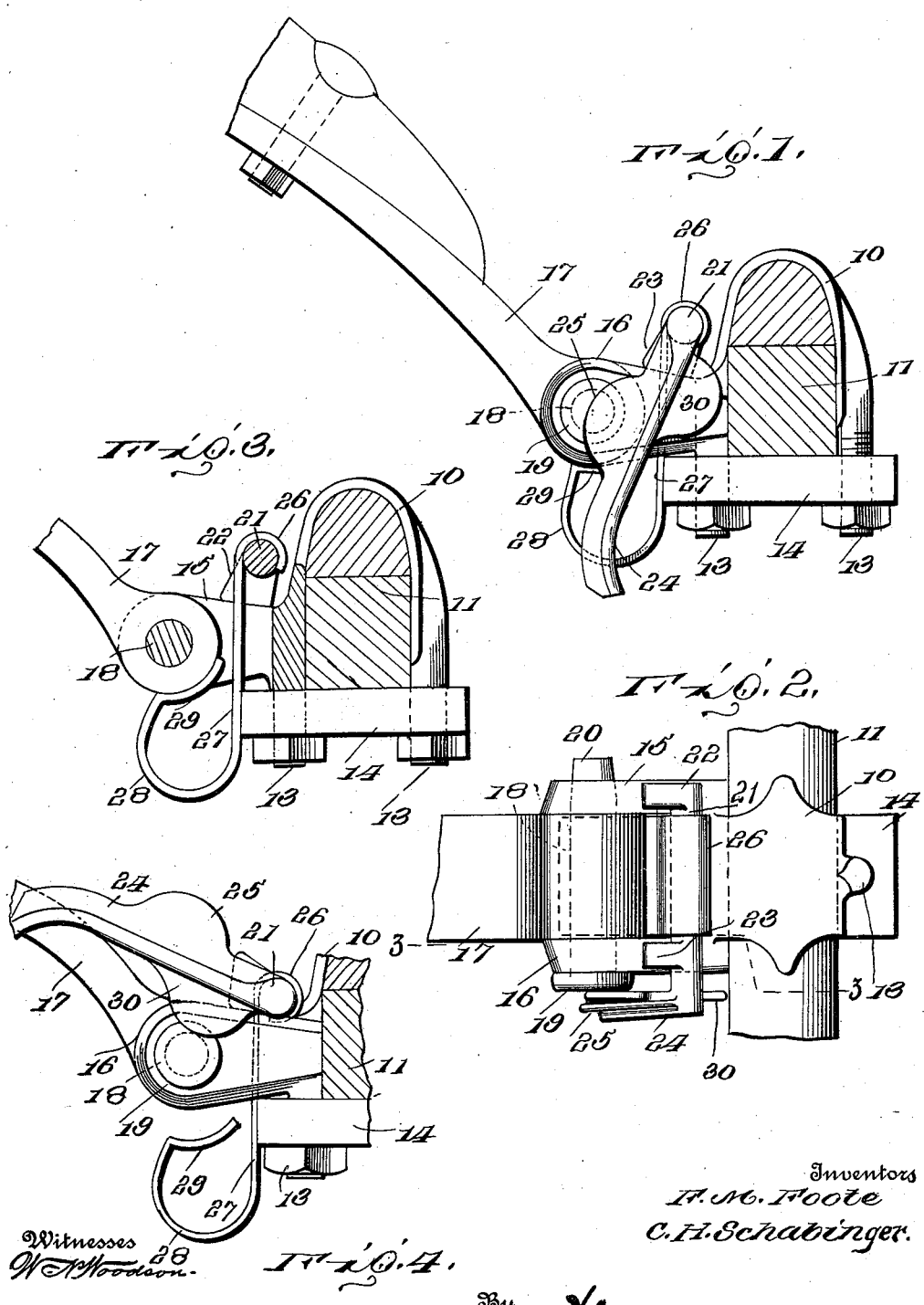
F. M. FOOTE & C. H. SCHABINGER.
THILL COUPLING ATTACHMENT.
APPLICATION FILED JAN. 7, 1911. RENEWED NOV. 25, 1911.
1,023,106.
Patented Apr. 9, 1912.

FRANK M. FOOTE AND CHARLES H. SCHABINGER, OF MARSHALL, MICHIGAN, ASSIGNORS TO FOOTE AXLE COMPANY, OF MARSHALL, MICHIGAN.

THILL-COUPLING ATTACHMENT.

1,023,106. Specification of Letters Patent. Patented Apr. 9, 1912.

Application filed January 7, 1911, Serial No. 601,456. Renewed November 25, 1911. Serial No. 662,466.

*To all whom it may concern:*

Be it known that we, FRANK M. FOOTE and CHARLES H. SCHABINGER, citizens of the United States, residing at Marshall, in the county of Calhoun and State of Michigan, have invented certain new and useful Improvements in Thill-Coupling Attachments, of which the following is a specification.

This invention relates to improvements in attachments for thill couplings to prevent rattling between the parts, and has for one of its objects to simplify and improve the construction and increase the efficiency and utility of devices of this character.

Another object of the invention is to produce a simply constructed device which may be applied without material structural changes to thill couplings of various forms and sizes and which may be readily attached to and disconnected from the thill coupling without the necessity of employing additional tools or implements.

Another object of the invention is the production of a device of this character which will hold the shackle pin locked in the clip regardless of the position of the anti-rattler device, and which will require the operating lever of the anti-rattler device to be disposed in an unusual position to release the shackle pin.

With these and other objects in view the invention consists in certain novel features of construction as hereinafter shown and described and then specifically pointed out in the claims, and in the drawings illustrative of the preferred embodiment of the invention, Figure 1 is a side elevation of a conventional thill coupling with the improvement applied, with the axle in transverse section; Fig. 2 is a plan view of the parts shown in Fig. 1; Fig. 3 is a section on the line 3—3 of Fig. 2; Fig. 4 is a detail view illustrating the arrangement of the parts when the locking lever and cams are in released position.

Corresponding and like parts are referred to in the following description and indicated in all the views of the drawings by the same reference characters.

The improved device may be applied without structural changes to thill couplings of various forms and sizes, and for the purpose of illustration is shown applied to a conventional thill coupling of the ordinary construction, in which 10 represents the body which bears over the axle, represented at 11, and provided with bolts 13 which engage through the coupling plate 14 and are provided with spaced arms 15—16 between which the "thill iron" or shackle 17 engages and held in place by the pin 18, these parts being of the usual construction except that the pin 18 is provided with an enlarged head 19 at one end and tapered slightly at the other end, as shown at 20, to facilitate the entering of the pin.

The improved attachment comprises a bar 21 having cam devices 22—23 spaced apart thereon and with an operating handle or lever 24 at one end. The lever 24 is located at the side nearest to the enlarged head 19 of the pin 18 and is provided with a projecting lip 25 at one side and a similar lip 30 from the other side, the lip 25 being designed to extend over the enlarged head of the pin when the lever is in its closed position, and the lip 30 to extend over the head 19 when the lever is in its released position to lock the pin in the clip, as hereinafter explained. The bar 21 is designed to extend over the arms 15—16 next to the body 10 of the clip with the cam members 22—23 bearing upon the upper faces of the arms, and engaging over the bar 21 between the cam devices 22—23 is a hooked upper portion 26 of a resilient plate 27, the latter extending downwardly between the arms 15—16 and likewise between the head portion of the shackle 17 and the clip plate 14. The plate 27 is extended a considerable distance below the arms 15—16 and is bent forwardly and thence upwardly, as shown at 28, and with its terminal curved, as shown at 29, to correspond with and bear against the under face of the head of the shackle. The plate 27 with its hooked terminal 26 and curved terminal 29 is so proportioned that when the lever arm 24 and the cam device 23 are turned into their upper position the head 19 of the pin 18 will be released and the strain removed from the member 27, so that the pin 18 may be detached to release the shackle. When, however, the lever is turned into its downward position the cam devices 22—23 will be caused to bear upon the upper faces of the arms 15—16 and exert a strong upward pull upon the member 27 and cause the curved terminal 29 to engage tightly against the head of the shackle 17, and at the same time dispose the lip 25 over the end 19 of the pin 18 and thus lock the latter in position.

It will be noted that the cam devices 22—23 are each formed with a flat side which engages against the arms 15—16 and thus prevents accidental displacement of the cams when in use. By this arrangement when the lever 24 is disposed in its downward position the lip 25 engages over the head 19 of the pin 18, as shown in Fig. 1, and then when the lever is in its upward or partly released position, the other lip 30 engages over the head of the pin, as shown in Fig. 4. Thus the pin is locked in position whether the lever be in operative or released position. Thus in event of the accidental displacement of the lever from any cause the pin 18 would not be released. It will be obvious that the pin can be released only by moving the lever 24 upward beyond the usual or natural position which it would occupy when released. This is an important feature of applicants' device and materially increases its efficiency and utility.

The bar 21, cams 22—23 and lever 24 and its lips 25—30 are constructed from a single casting, preferably of steel or malleable iron, while the plate 27 with its terminals 26 and 29 is likewise formed from a single piece, but of steel suitably tempered to enable it to withstand the strains to which it will be subjected, and to retain the necessary grip and pressure against the shackle.

It is obvious that a simply constructed anti-rattler attachment is produced which may be adapted without material structural changes to a thill clip, and without the necessity for employing wrenches, screw drivers, pincers, or other implements.

Having thus described our invention, what we claim as new is:

1. An anti-rattler for thill couplings comprising a bar having cams spaced apart and adapted to engage upon the shackle arms of a thill coupling, a lever arm connected to said bar, a lip on the lever arm adapted to bear over one end of the shackle pin of the thill coupling when the lever is disposed in closed position, and another lip on the lever adapted to bear over a shackle pin when the lever is disposed in partly released position and fully releasable only when the lever is moved into an unusual position.

2. The combination with a thill coupling including spaced shackle arms, of a pin extending through said arms and enlarged at one end, a thill shackle having a head located between said shackle arms and rotative upon said pin, a bar having cams spaced apart and engaging upon said shackle arms, a resilient member movably engaging said bar at one end and with a seat at the other end for bearing against the head of the thill shackle, a lever arm extending from said bar, a lip upon said lever arm and extending over the ellarged end of the shackle pin when the lever is disposed in closed position, and another lip on the lever adapted to bear over a shackle pin when the lever is disposed in partly released position and fully releasable only when the lever is moved into an unusual position.

In testimony whereof, we affix our signatures in presence of two witnesses.

FRANK M. FOOTE. [L. S.]
CHARLES H. SCHABINGER.

Witnesses:
FRANK J. GROFF,
COULTON C. VARY.

---

Copies of this patent may be obtained for five cents each, by addressing the "Commissioner of Patents, Washington, D. C."